Oct. 20, 1942.    R. H. DREISBACH    2,299,536
PICTURE PROJECTOR
Filed Oct. 6, 1941
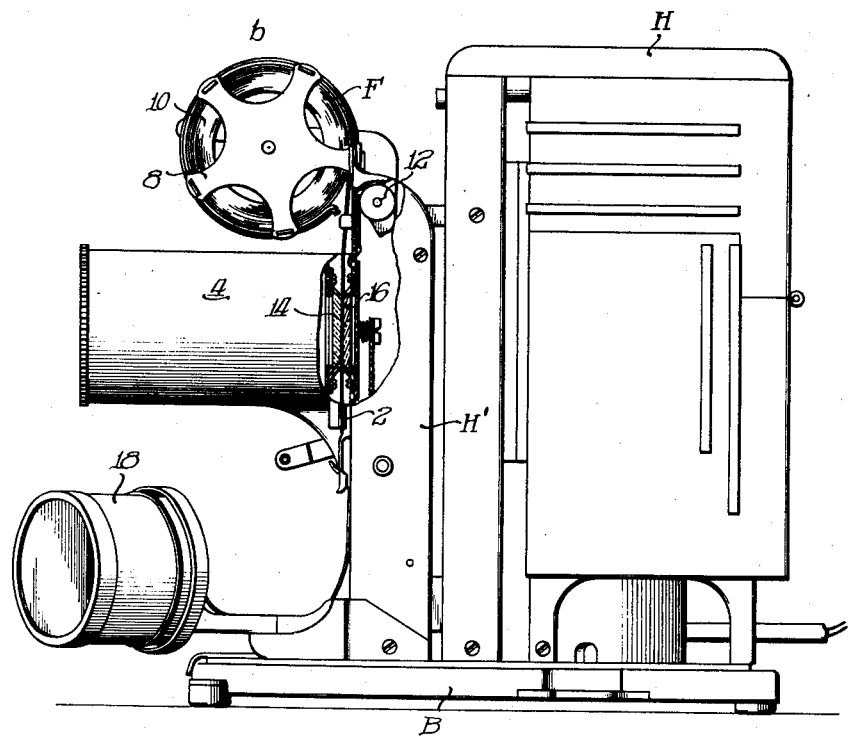
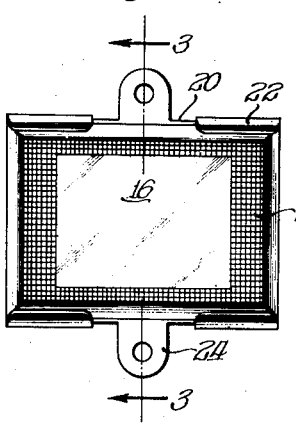 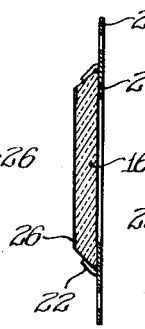 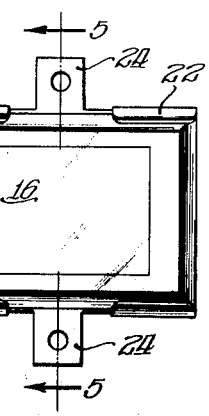 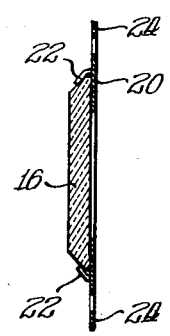
INVENTOR.
Robert H. Dreisbach
BY
Parkinson + Lane ATTORNYS:

Patented Oct. 20, 1942

2,299,536

UNITED STATES PATENT OFFICE 2,299,536

PICTURE PROJECTOR

Robert H. Dreisbach, Fort Wayne, Ind., assignor to The Magnavox Company, Inc., Fort Wayne, Ind., a corporation of Indiana Application October 6, 1941, Serial No. 413,805

1 Claim. (Cl. 88—26)

This invention relates to projectors by which images are projected for demonstrative, educational and other purposes.

In such picture projectors as heretofore constructed, it has been usual to feed the film forward between two glass guide blocks, forming, if desired, part of the lens system, namely, a front block or lens which is disposed in the front of the film and a rear block or lens disposed behind the film, with the aperture frame placed behind the film and separated from the film by a rear aperture glass about ⅛" thick. With such an arrangement the aperture frame is, therefore, ⅛" out of focus when the plane of the film is in focus and this results in a projected aperture which has blurred edges with several shadow lines all around which fall in the field of the projected picture, instead of the desirable sharply focused edges.

An object of the present invention is to overcome the above recited disadvantages by eliminating the said undesirable effect.

Another object of the invention is to provide an aperture frame which is disposed in the same plane as the film.

With the above and other objects in view, the invention consists in providing an aperture frame which is disposed in the same plane or in contact with the film and to make this aperture frame of such a material that it will prevent scratching of the film as it is fed forward.

Aperture frames have heretofore been made of metal, but it has been found impossible to place the frame in contact with the film because the metal must be of such a thickness that it would prevent the glass from clamping the film flat over its entire surface and which would result in the film warping and this in turn would cause some areas of it to be in focus and others to be out of focus. According to the present invention, therefore, the aperture frame is developed in an aperture glass surface which contacts the film and comprises an opaque ceramic material which is fired into the glass with the result that it presents to the film a glass-smooth and glass-hard surface which will not injure the film and which can be ground and polished at its outer edge the same as the glass.

Further objects in the invention will become apparent from the following description of the device which is given by way of example only, it being understood that any modification within the scope of the invention may be utilized without departing from the spirit of the invention.

In the drawing:

Fig. 1 is a side elevation of a slide-film projector partly in section in order to show the construction according to the present invention.

Fig. 2 is a front view of the rear aperture glass or lens and holder showing the aperture frame of the present invention.

Fig. 3 is a cross section taken on the line 3—3 of Fig. 2.

Fig. 4 is a front view showing the rear aperture glass or lens, holder, and aperture frame of the type now well known and widely used.

Fig. 5 is a cross section taken on the line 5—5 of Fig. 4.

For the sake of convenience the arrangement according to the present invention is illustrated as applied to a projector substantially of the general type illustrated in the co-pending application, Serial No. 316,462, filed January 31, 1940, of William E. Kierulff et al.

It is to be understood, however, that the invention may be applied to any type of projector from which images are adapted to be projected onto a screen or other desirable surface, and the following description of the projector is accordingly given only by way of example.

Referring to Fig. 1, the projector comprises a rectangular housing H in front of which is preferably removably secured a vertically disposed flanged member H—1 which carries and houses the film feeding and guiding mechanism and to which element there is hingedly secured in the well known manner as by hinges 2, one of which is shown in Fig. 1, a tubular projection or barrel 4 containing part of the lens system. As shown, the projector is mounted in its entirety upon a base support B, and secured to and extending upwardly from the member H—1 is a thin plate which is curved around to form a generally cylindrical container 6 to receive a roll of film F which is to be fed through the projector.

One side of the container is bridged by a star-shaped plate 8 whilst at the opposite side of the container is arranged a movable arm 10 pivoted by a pin 12 to a side wall of the member H—1, this arm when in its vertical position permitting the film to be inserted into the container 6, whereafter on the arm being moved to the position shown in Fig. 1, the film will be retained within the container without possibility of displacement.

The film as it is unrolled from the container 6, is passed downwardly along the front wall of the member H—1, which has the usual film track thereon, between the front aperture glass or lens 14 which is carried by the tubular projection 4 and the rear aperture glass or lens 16 which is pivotedly mounted in any suitable well known manner in the member H—1, to the film guiding and rewinding means 18, a description of which is not necessary here as it forms no part of the present invention.

The forward movement of the film through the projector may be accomplished in any suitable manner, for example, as described in the co-pending application, Serial No. 316,462.

Reference should now be had to Figs. 4 and 5 of the drawing wherein there is shown a rear aperture assembly of the known type and which comprises a rectangular glass or lens approximately ⅛" thick, which is mounted within a rectangularly shaped metal aperture frame 20, the aperture, of course, being provided by cutting the metal of the frame to the extent desired to provide a correctly dimensioned opening, the glass or lens being secured within the frame by means of the turned over ears 22. 24 are apertured lugs which project, as usual, from the top and bottom of the frame to secure the assembly in position in the well known manner.

Turning now to Figs. 2 and 3 which show the arrangement according to the present invention, we have, as before, the rectangular glass or lens 16, the metal frame 20 with its ears 22 and its apertured lugs 24 mounted against the rear face of the glass 16. In this case, however, the aperture is defined not by the aperture in the metal frame 20, but by an aperture on the front face of the glass 16 defined by the inner faces or edges of a rectangular opaque ceramic frame 26 fired into the glass on its said front face so as to present to the film a smooth, hard surface which will not injure the film and which can be ground and polished at its outer edge the same as the glass itself.

The open field of the metal frame 20 should be larger than the aperture defined by the ceramic frame 26 on the front face of the glass or lens 16.

By thus providing the rear glass or lens 16 with an aperture defined by a smooth and hard opaque surface formed, as it were, within the glass itself, all shadow lines which have heretofore fallen in the field of a projected picture are eliminated and perfectly focused edges obtained, the reason, of course, being that with the present arrangement the aperture of the rear glass is in contact with the rear face of the film instead of being disposed at a distance rearwardly of the latter. Further with the present structure, the operator may readily and quickly focus the projector before the film is loaded.

My invention further affords the advantage of providing a structure housing the aperture frame in the same plane as the film.

I claim:

A film projector having a film feeding and guiding means including front and rear glass guide blocks between which the film is adapted to be fed, said rear guiding block comprising a rectangular lens, a rectangular metal apertured frame disposed adjacent the rear face of said lens, means carried by said frame for mounting the lens therein, and an opaque ceramic aperture frame fired into the front face of the glass, the open field in the frame being of larger dimensions than the aperture of said ceramic frame.

ROBERT H. DREISBACH.